United States Patent [19]

Nagaoka et al.

[11] Patent Number: 5,123,757
[45] Date of Patent: Jun. 23, 1992

[54] PRINTING SYSTEM USING RECEIVED CONTROL PROGRAM FROM WORD PROCESSOR

[75] Inventors: Masanobu Nagaoka; Katsufumi Takagishi, both of Hitachi, Japan

[73] Assignee: Hitachi, Ltd., Tokyo, Japan

[21] Appl. No.: 367,674

[22] Filed: Jun. 19, 1989

[30] Foreign Application Priority Data

Jun. 23, 1988 [JP] Japan .................. 63-155199

[51] Int. Cl.$^5$ .............................................. B41J 5/30
[52] U.S. Cl. ........................................ 400/61; 395/114
[58] Field of Search ................... 400/61, 62, 70, 71, 400/77, 121; 346/154; 364/518, 519; 332/106-116; 395/114

[56] References Cited

U.S. PATENT DOCUMENTS

| | | | |
|---|---|---|---|
| 4,117,518 | 9/1978 | Skala | 346/154 |
| 4,426,166 | 1/1984 | Bowling | 400/62 |
| 4,462,701 | 7/1984 | Czyszczewski | 400/70 |
| 4,556,959 | 12/1985 | Allen | 400/70 |
| 4,584,691 | 4/1986 | Herr | 332/109 |
| 4,641,263 | 2/1987 | Perlman | 364/519 |
| 4,694,405 | 9/1987 | Bradbury | 346/154 |
| 4,698,755 | 10/1987 | Okazaki | 346/154 |
| 4,712,929 | 12/1987 | Kitaoka | 400/61 |
| 4,741,635 | 5/1988 | Shibata | 400/61 |
| 4,742,485 | 5/1988 | Carlson | 400/63 |
| 4,754,428 | 6/1988 | Schultz | 400/70 |
| 4,779,105 | 10/1988 | Thomson | 346/154 |
| 4,811,242 | 3/1989 | Adachi | 400/61 |
| 4,826,332 | 5/1989 | Ukai | 400/61 |
| 4,831,554 | 5/1989 | Storace | 364/519 |
| 4,839,829 | 6/1989 | Freedman | 364/519 |
| 4,843,571 | 6/1989 | Notermans | 364/518 |
| 4,858,148 | 8/1989 | Ueda | 364/518 |
| 4,898,483 | 2/1990 | Iizuka | 400/70 |
| 4,968,159 | 11/1990 | Sasaki | 400/76 |

FOREIGN PATENT DOCUMENTS 282921 12/1986 Japan .................. 400/76

Primary Examiner—David A. Wiecking
Assistant Examiner—Steven S. Kelley
Attorney, Agent, or Firm—Antonelli, Terry, Stout & Kraus

[57] ABSTRACT

Disclosed is a printing system in which a text created on one of a plurality of word processors is printed on a single print means. Each of the word processors comprises input means for entering display and printing process signals including a text signal and a print request signal for a text to be printed, first transmitter/receiver means connected to the controller for transmitting and receiving information to/from the controller, means for creating text data based on the entered text signal, first memory means for storing the created text data and a predetermined print process program specific to the word processor, display means for displaying the created text data in accordance with the entered display process signal, and means for sending information which includes the created text data and the print process program to the controller by way of the first transmitter/receiver means in response to an information request signal from the controller. The print means includes a controller, which comprises second transmitter/receiver means connected to the first transmitter/receiver means of each word processor for transmitting and receiving information to/from each of the word processors, second memory means for storing a predetermined print control program, means for inquiring of each word processor the presence of absence of the print request and sending the information request signal to the word processor having the print request, third memory means for storing information including the text data and the print process program which have been transmitted from the word processor in response to the information request signal and received through the second transmitter/receiver means, means for creating dot-matrix print data based on the information stored in the third memory means and in accordance with the print control program, and means for transferring the dot-matrix print data to the printer for printing.

5 Claims, 4 Drawing Sheets a. CPU DATA    0 1 0 0 1 1 0 0 0 b. SERIAL DATA A c. SYNCHRONOUS CLOCK B d. TRANSMISSION DATA

PRINTING SYSTEM USING RECEIVED CONTROL PROGRAM FROM WORD PROCESSOR

BACKGROUND OF THE INVENTION

1. Field of the Invention

This invention relates to a printing system for a document writing apparatus (word processors), and particularly to a printing system suitable for printing the content of text data created on a plurality of word processors.

2. Description of the Related Art

In document writing systems using thermal transfer printers or wire dot-matrix printers, it is a general convention to connect one printer to each word processor. When high-speed, high-quality printers, such as laser printers, are used, one printer is connected to a plurality of word processors, in general, because of their ability of short print time, as described in Japanese Patent Unexamined Publication No. 61-282921 published on Dec. 13, 1986.

A conventional document printing system is described in the catalogue of Japanese word processor model Word Pal 860, manufactured by Hitachi, Ltd., published in 1985. This system allows a laser printer to be connected to two word processors, and performs fast printing using the single laser printer by transferring text data created on the two word processors to the printer alternately.

In the conventional document printing system, each word processor incorporates a controller for converting the text data into dot-matrix print data in a page unit, and the laser printer operates in accordance with the commands from each controller. On this account, even though only one laser printer is required, every word processor needs to have an individual controller, resulting unfavorably in a high system cost as a whole.

SUMMARY OF THE INVENTION

A first object of this invention is to provide a printing system which prints text data, that is data created on a plurality of word processors, sequentially with printing means which includes a controller and a printer.

A second object of this invention is to provide a word processor, which is connected to at least one other similar word processor and printing means including a controller and a printer, and is suitable for printing sequentially text data created on these word processors with the printer.

A third object of this invention is to provide a controller which, for printing text data created on a plurality of word processors sequentially by one printer, is connected between the word processor group and the printer and designed to convert text data created on any one of the word processors into dot-matrix print data to be delivered to the printer in response to a print request from the word processor.

A fourth object of this invention is to provide a word processor having connection means which is adapted in structure to connect the word processor and other similar word processors in parallel to printing means.

The inventive printing system comprises a plurality of word processors and printing means, including a controller and a printer connected to the controller, and connected to the word processors, each of the word processors comprising input means for entering display and print process signals including a text signal and a print request signal for a text to be printed, first transmitter/receiver means connected to the controller for transmitting and receiving information to/from the controller, means for creating text data based on the entered text signal, first memory means for storing the created text data and a predetermined print process program specific to the word processor, display means for displaying the created text data in accordance with the entered display process signal, and means for transmitting information which includes the created text data and the print process program to the controller by way of the first transmitter/receiver means in response to an information request signal from the controller, the controller comprising second transmitter/receiver means connected to the first transmitter/receiver means of each word processor for transmitting and receiving information to/from each of the word processors, second memory means for storing a predetermined print control program, means for inquiring of each word processor the presence or absence of a print request and transmitting the information request signal to a word processor having a print request, third memory means for storing the information including text data and print process program which have been sent from the word processor in response to the information request signal and received through the second transmitter/receiver means, means for creating dot-matrix print data based on the information stored in the third memory means and in accordance with the print control program, and means for transferring the dot-matrix print data to the printer for printing.

The inventive word processor is suitable for use in connection with at least one other similar word processor and printing means, and the word processor comprises input means for entering display and print process signals including a text signal and a print request signal for a text to be printed, transmitter/receiver means connected to the controller for transmitting and receiving information to/from the controller, means for creating text data based on the entered text signal, memory means for storing the created text data and a predetermined print process program specific to the word processor, display means for displaying the created text data in accordance with the entered display process signal, and means for transmitting information which includes the created text data and the print process program to the controller by way of the transmitter/receiver means in response to an information request signal from the controller.

The inventive controller is connected between a group of word processors and a printer and is designed to control the printer to print text data, which is created on any one of the word processors, in accordance with a print process program specific to the word processor, and the controller comprises transmitter/receiver means connected to each of the word processors for transmitting and receiving information to/from each word processor, first memory means for storing a prescribed print control program, means for inquiring of each word processor the presence or absence of a print request and transmitting an information request signal to the word processor having a print request, second memory means for storing information including text data and a print process program which have been transmitted from the word processor in response to the information request signal and received through the transmitter/receiver means, means for creating dot-matrix print data based on the information stored in the second memory means and in accordance with the print control program, and means for transferring the dot-matrix print data to the printer for printing.

According to this invention, only one word processor designated by the controller among a plurality of word processors is allowed to exchange information with the controller. When text data is transferred over the signal line from one word processor selected by the controller, the data is converted into dot-matrix print data in a page unit in accordance with the print process program specific to the word processor and then transferred to the printer. Accordingly, the single controller is shared by all of the word processors, and text data created on the word processors are converted into page-wise dot-matrix print data sequentially. In case the word processors have different functions, the print process program specific to each word processor is transferred to the controller when the word processor exchanges information with the controller so that printing based on the print process program of that word processor takes place, whereby a flexible printing system can be realized.

DESCRIPTION OF THE PREFERRED EMBODIMENTS

Figure 1:
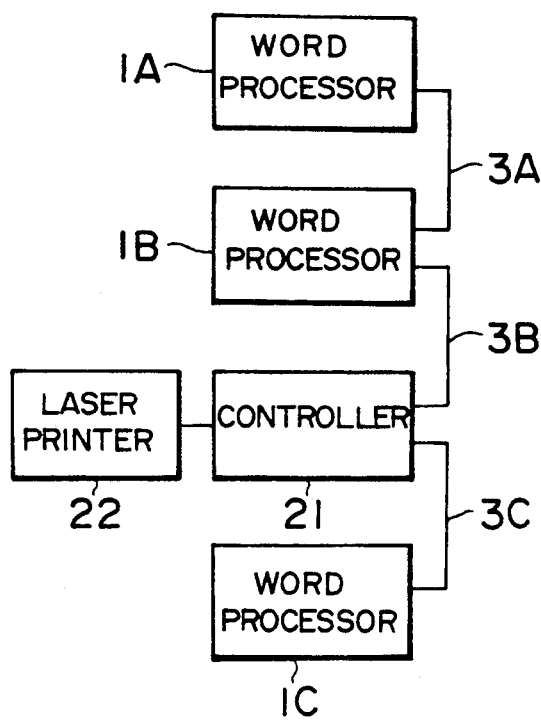
FIG. 1 is a block diagram showing the overall printing system according to an embodiment of this invention.

An embodiment of this invention will be described with reference to FIG. 1. In FIG. 1, a word processor 1A is connected to a controller 21 through signal lines 3A and 3B, a word processor 1B is connected to the controller 21 through the signal line 3B, and a word processor 1C is connected to the controller 21 through a signal line 3C. Each word processor is designed to create text data based on text signals entered through a keyboard by the operator, and transfer the text data and a print process program, which is specific to the word processor and stored in its memory in advance, to the controller 21 over the signal line 3A, 3B or 3C in response to a request from the controller 21. Namely, when the text is completed on one word processor, the operator inputs a print request signal through the keyboard. The controller issues an inquiry of print request to all the word processors sequentially in a predetermined order. In response to the print request signal from any word processor, the controller transmits a printer busy signal to the other word processors, and transmits an information request signal to the word processor having the print request signal, which then transmits the completed text data and the print process program to the controller.

The controller 21 converts the text data into dot-matrix print data in a page unit, i.e. one unit of the dot-matrix print data representing one page of the text data, in accordance with the print process program received from the word processor, and transfers the data to a laser printer 22, which prints text in a page unit based on the dot-matrix data.

Figure 3:
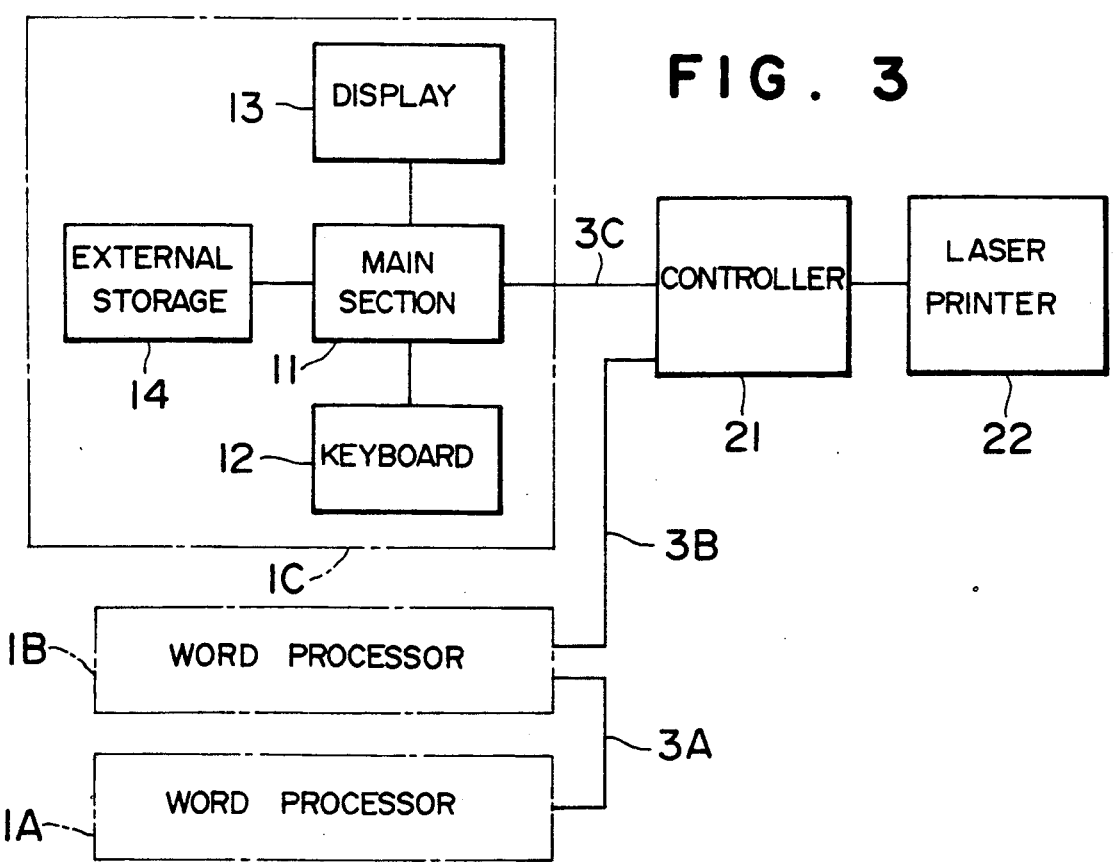
FIG. 3 is a block diagram showing the arrangement of the word processor.

The word processors 1A, 1B and 1C are Japanese word processors or personal computers, for example, each made up of a main section 11 which performs text creation processes such as Kana-Kanji conversion, a keyboard 12 for entering signals that represent a text to be created and signals for display and printing, a display unit 13, and an external storage 14 such as a floppy disk unit for storing the created text, as shown in FIG. 3. The word processors 1A-1C are designed to create text data in accordance with the operation of the keyboard 12 by the operator, code the created text, store the coded text data on the floppy disk, and transfer the text data retrieved from the floppy disk to the controller 21 in response to the request of the controller 21.

Figure 4:
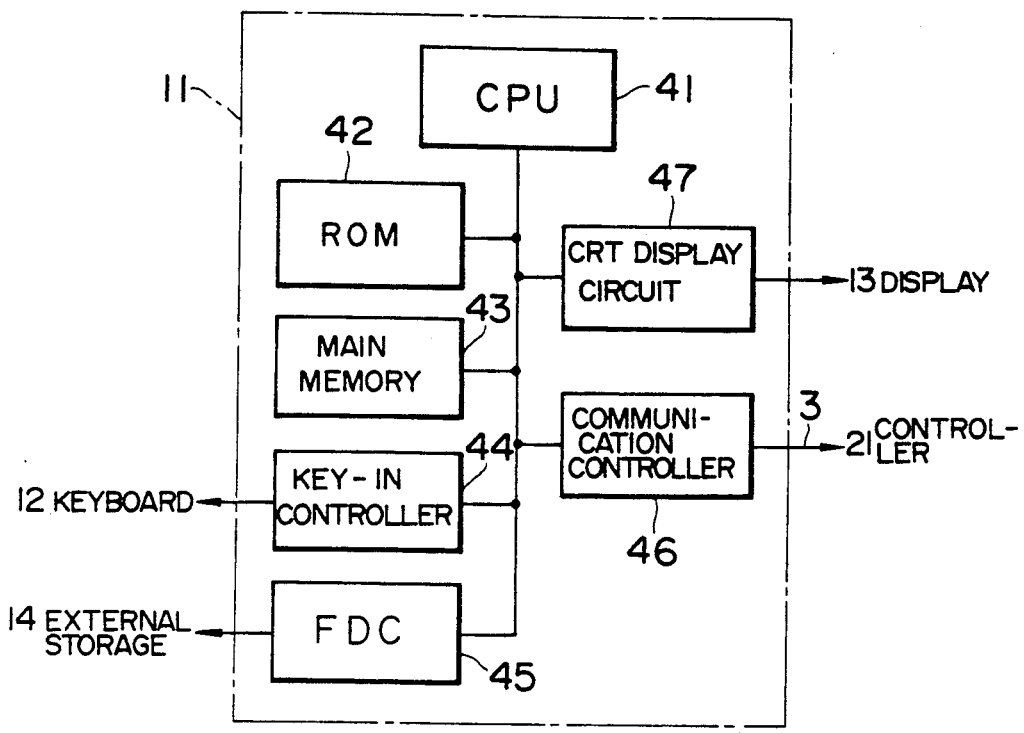
FIG. 4 is a block diagram showing the arrangement of the main section of the word processor.

The main section 11 of the word processors 1A-1C includes a CPU 41 formed of a program-storing type computer unit, a ROM 42 as an initial program loader storing a program to be executed when the processor is turned on, a main memory 43 including a random access memory (RAM) for storing a text creating program for execution of the word processor main function and text data created by the CPU on the basis of the text signals and the text creating program, a CRT display circuit 47 which produces a display pattern in accordance with a command from the CPU 41 and sends an image signal to the display unit 13, a floppy disk control circuit (FDC) 45 for controlling an operation of an external storage unit 14 such as a floppy disk in accordance with a command from the CPU 41, a key-input controller 44 which controls the keyboard 12 and sends input signals entered by the keyboard 12 to the CPU 41, and a communication controller 46 which performs data exchange with the controller 21 in response to the command from the CPU 41, as shown in FIG. 4. One or more print process programs specific to the word processor are stored on the floppy disk 14, and one of the programs selected through the input operation on the keyboard 12 is loaded into the main memory 43. The coded text data stored in the main memory 43 is fed in the form of 8-bit or 16-bit parallel data to the communication controller 46, which converts the data into serial data and transfers it to the controller 21 over the signal lines 3A, 3B and 3C.

Figure 5:
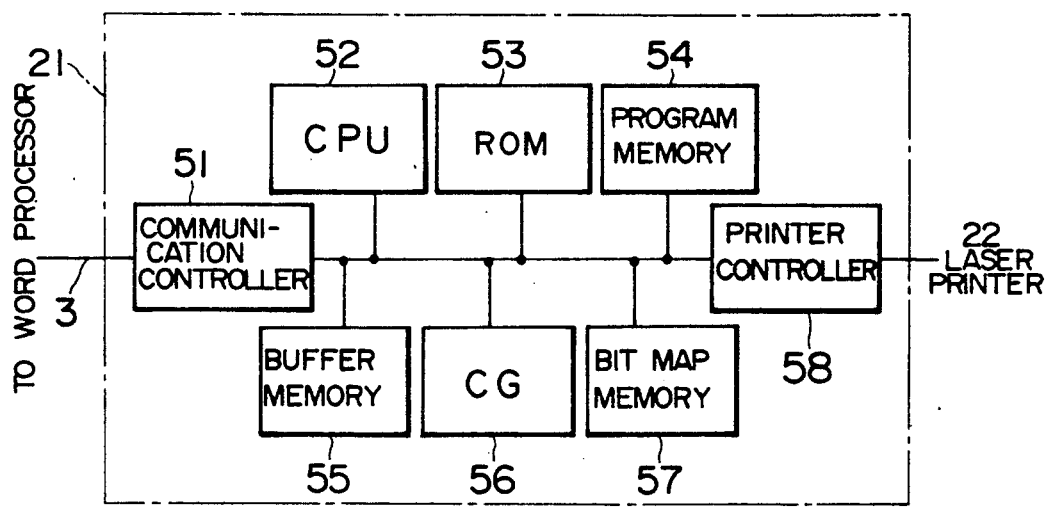
FIG. 5 is a block diagram showing the arrangement of the controller.

The controller 21 includes a communication controller 51, a CPU 52, a ROM 53, a program memory 54, a buffer memory 55, a character generator 56, a bit map memory 57, and a printer controller 58, as shown in FIG. 5. The CPU 52 is formed of a program-storing type computer unit, and the ROM 53 is a nonvolatile memory for storing an initial program to be executed by the CPU at power-on of the system and a print control program for operating the CPU to carry out the print process. The communication controller 51 converts bit-serial data of the text data, which has been entered through the signal line 3A, 3B or 3C by the command of the CPU in compliance with the print control program, into 8-bit or 16-bit parallel data, and transfers it to the buffer memory 55. The program memory 54 is a random access memory (RAM), in which are stored print process programs sent from the word processors. The character generator 56 stores various character patterns and a selected one of the character patterns is read out of the character generator 56 in accordance with the text data and the CPU command and then loaded into the bit map memory 57.

The controller 21 arranged as described above selects one of the word processors 1A-1C in accordance with the designation command from the CPU 52, stores the print process program received from the selected word processor into the program memory 54, and stores the text data in the buffer memory 55. Subsequently, the controller 21 reads out a character pattern, which corresponds to the text data stored in the buffer memory 55, from the character generator 56 in accordance with the print process program, and stores the character pattern in the bit map memory 57. These operations are repeated for whole pages of data, and dot-matrix print data for one page is set in the bit map memory 57. After that, the controller 21 sequentially transfers the dot-matrix print data from the bit map memory 57 to the laser printer 22 by way of the printer controller 58 in response to the command from the CPU 52, and a text of each page is printed on a sheet of print paper. The laser printer 22 used in this embodiment is the one disclosed in U.S. Pat. No. 4,387,983 issued on Jun. 14, 1983, for example.

Figure 6:
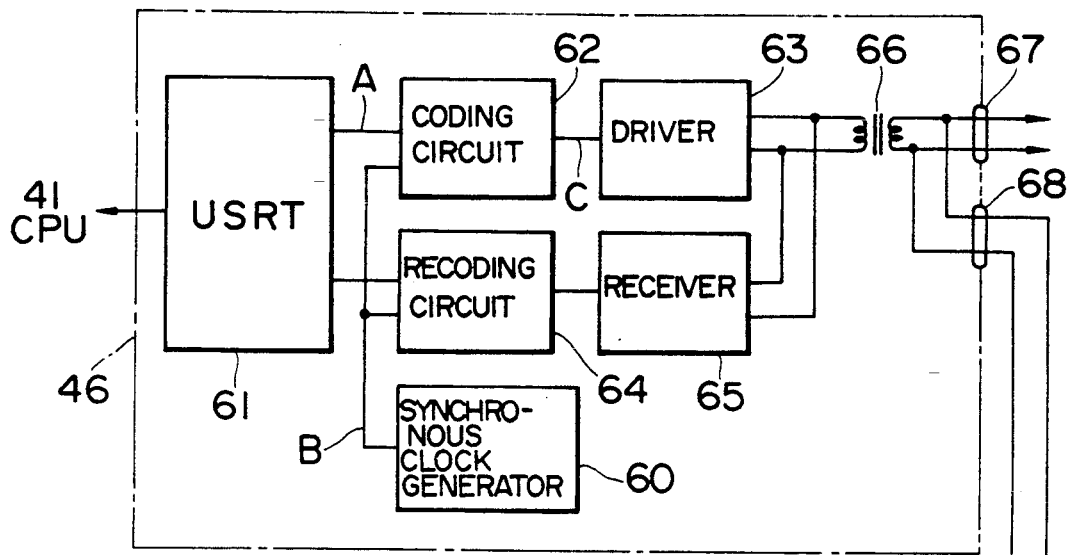
FIG. 6 is a block diagram showing the arrangement of the communication controller.
Figure 6:
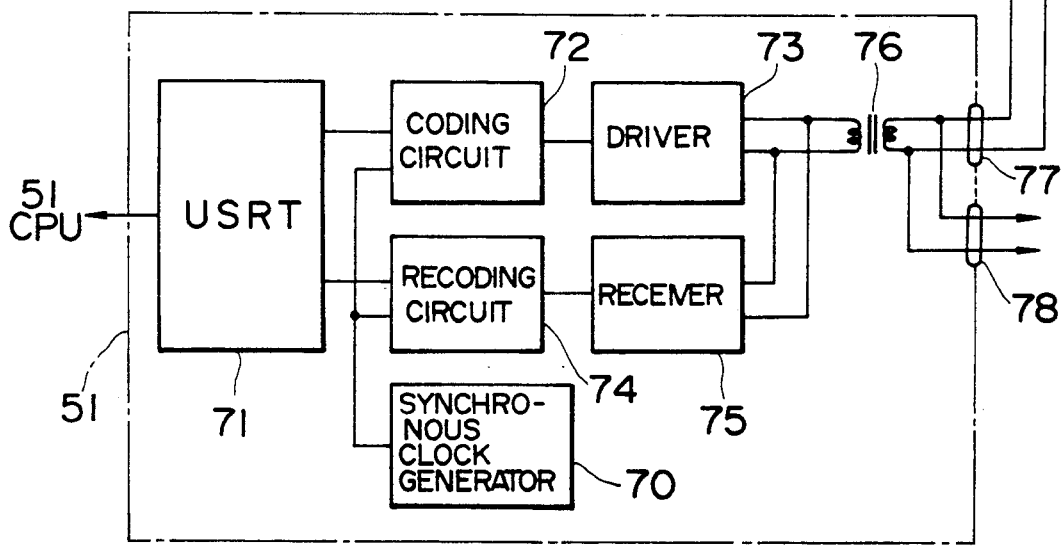

The communication controller 46 or 51 is made up of synchronous or synchronization clock generating circuit 60 or 70, universal synchronous receiver/transmitter (USRT) 61 or 71, coding circuit 62 or 72, driver 63 or 73, decoding circuit 64 or 74, receiver 65 or 75, transformer 66 or 76, and connectors 67, 68 or 77, 78, as shown in FIG. 6. The communication controller 46 and 51 are connected with each other through the connectors 67, 68, 77 and 78.

The USRT 61 and 71 are each formed of a synchronous serial transmission LSI which functions to interface with the CPU 41 or 52 for the serial data transmission. The USRT 61 or 71 is designed to convert parallel data from the respective CPU 41 or 52 into serial data to be delivered to the coding circuit 62 or 72, and convert serial data from the decoding circuit 64 or 74 into parallel data to be delivered to the CPU 41 or 52. The coding circuit 62 or 72 operates to convert the transmission data to have a waveform in which the same signal level does not last longer than one cycle period of the clock so that the transformer 66 or 76 is not saturated, as will be described later, thereby preventing a transmission error due to a waveform distortion for a transmission distance between the word processor and the controller ranging from several tens of meters to 1000 m, and allowing the transmission binary data to include consecutive bits of the same level. The driver 63 or 73 is designed to amplify the signals from the coding circuit 62 or 72 before the signals are applied to the transformer 66 or 76. The transformer 66 or 76 is provided for data transmission and reception and functions to send normal mode signals, i.e., signals that are free from d.c. noise components, over the signal lines. The receiver 65 or 75 detects the transmission signals entered through the transformer 66 or 76, and the decoding circuit 64 or 74 receives the transmission signals from the receiver 65 or 75 and the synchronization clock from the clock generation circuit 60 or 70, decodes the transmission signals back to the original transmission data waveforms, and delivers the decoded data signals to the USRT 61 or 71.

Figure 7:
FIG. 7 shows waveforms at various points in the communication controller for explanation of its operation.
Figure 7:
Figure 7:

The communication controller 46 or 51 uses for data transmission a modulation system as shown in FIG. 7. For example, in case a word processor sends character data 010011000 as shown by (a) in FIG. 7, the CPU 41 in the word processor sends parallel data, in which "0" and "1" are represented by low- and high-level signals, respectively, to the communication controller 61. The communication controller 61 converts the data into serial data A, as shown by (b) in FIG. 7, and delivers it to the coding circuit 62. The coding circuit 62 modulates the clock B from the clock generation circuit 60 as shown by (c) in FIG. 7 with the serial data A to produce transmission data C as shown by (d) in FIG. 7, and sends it to the controller by way of driver 63 and transformer 66. Signals sent from the controller to any word processors are modulated in the same manner by the coding circuit 72.

The modulation outputs produced by the coding circuits 62 and 72 have a waveform of the clock B, with its level being reversed from a high level to a low level and from a low level to a high level when the serial data A is high, or have the same waveform as the clock B when the serial data A is low. As a result of this modulation, the transmission data applied to the transformer 66 or 76 does not continue the same level longer than one cycle period of the clock B, as shown by (d) in FIG. 7, and the transformer is prevented from being saturated. The transmission data essentially has the same waveform components as the clock, allowing communication over a set of signal lines 3A, 3B and 3C. Even in the case of longer transmission distances covering a plurality of word processors, they can readily be connected using signal lines of a small wire diameter.

Figure 2:
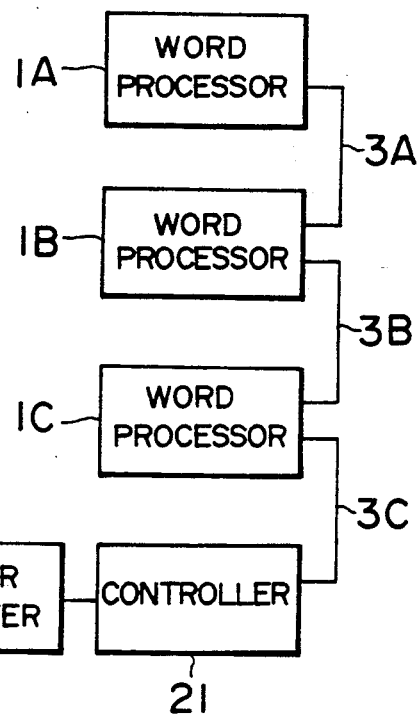
FIG. 2 is a block diagram showing the overall printing system according to another embodiment of this invention.

Each of the communication controllers 46 and 51 has a pair of connectors 67 and 68, or 77 and 78. Each word processor has its connectors 67 and 68 usable as connectors for the serial connection of signal lines, and therefore a plurality of word processors can be connected in common to the controller 21 by connecting the connectors of the word processors and the controller to one another through the signal lines. Accordingly, the controller 21 can be placed between the word processor 1B and the word processor 1C as shown in FIG. 1, or the word processors 1A, 1B and 1C can be connected in series through signal lines 3A and 3B while the controller 21 is connected to the word processor 1C through a signal line 3C as shown in FIG. 2.

Figure 8:
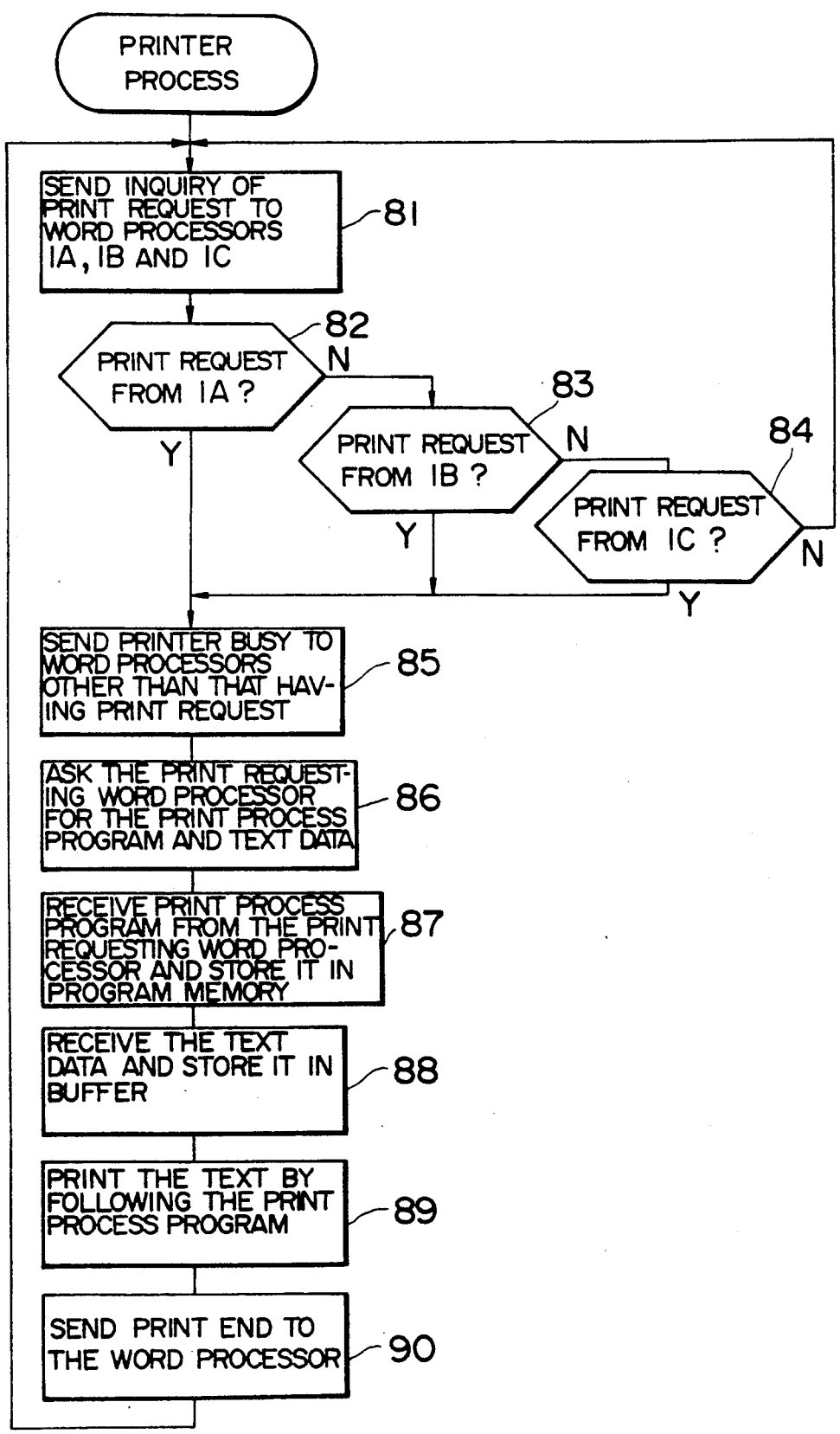
FIG. 8 is a flowchart showing the operation of the inventive printing system.

Next, the operation of this embodiment for printing text data will described with reference to the flowchart of FIG. 8.

As described hereinbefore, when the creation of text data is completed by a word processor, the print request signal is input to the CPU 41 of the word processor through the keyboard by operation of the operator. The CPU 52 of the controller 21 issues an inquiry of presence or absence of a print request sequentially in a predetermined order to all the word processors connected to the controller, i.e., word processors 1A, 1B and 1C in this embodiment, in accordance with the print control program (step 81). If any word processor having the print request responds with "yes" to the inquiry (steps 82, 83, 84), the sequence proceeds to step 85. If all the word processors respond with "no", the sequence returns to step 81. In step 85, the controller sends the printer busy signal to the word processors other than the word processor having the print request. The information request signal is sent from the controller to the print requesting word processor (step 86), which then responds to the request to send the created text data and its own print process program to the controller. The controller stores the received print process program in the program memory 54 (step 87), and stores the received text data in the buffer memory 55 (step 88). Subsequently, the controller converts the text data into page dot matrix print data in a page-unit in accordance with a print process program in a manner as mentioned previously, and sends the print data through the printer controller 58 to the laser printer 22, which then prints the data on each page on a sheet of print paper (step 89). After the entire text data has been printed, a print end signal is sent to the print requesting word processor (step 90), and the sequence returns to step 81.

Through the repetition of the above process, the controller 21 connected with a plurality of the word processors can print text data from any word processor having a print request sequentially in accordance with the print process program of each word processor without creation of conflicts among the print requests of the word processors.

According to this invention, as described above, text data created by a plurality of the word processors are printed after being converted into dot-matrix print data in a page unit sequentially by means of a single controller. Accordingly, the word processors do not need to have individual controllers and an inexpensive printing system can be realized. Because the transfer of an individual print process program from any word processor having the print request to the controller is carried out at a time when the text data of that word processor is to be sent to the controller for printing, the text data can be printed in compliance with the specific function of that word processor which may be different from the function of any other word processor, whereby a flexible printing system can be provided.

We claim:

1. A word processor for use with print means in common with at least one other word processor, said word processor comprising:
   connector means for electrically connecting the word processor to the print means;
   input means for entering display and print process signals including a text signal and a print request signal for a text to be printed;
   transmitter/receiver means connected through said connector means to said print means for transmitting and receiving information to/from said print means;
   means for creating text data based on an entered text signal;
   memory means for storing created text data and a predetermined print process program specific to said word processor for converting the created text data into print data for said print means;
   display means for displaying the created text data in accordance with the entered display process signal; and
   means for sending information which includes the created text data and the print process program to said print means by way of said transmitter/receiver means in response to an information request signal from said print means.

2. A word processor according to claim 1, wherein said transmitter/receiver means comprises means for generating a synchronization clock and a coding circuit for modulating the synchronization clock with the information to be sent to said print means, said information being sent to said print means in the form of a modulated signal.

3. A printing system comprising a plurality of word processors and print means connected to said word processors for printing data received from said word processors, said print means including a controller and a printer connected to said controller for use in common by said plurality of word processors, each of said word processors comprising:
   input means for entering display and print process signals including a text signal and a print request signal for a text to be printed, first transmitter/receiver means connected to said controller for transmitting and receiving information to/from said controller, means for creating text data based on the entered text signal, first memory means for storing the created text data and a prescribed print process program specific to said word processor, display means for displaying the created text data in accordance with the entered display process signal, and means for transmitting information which includes the created text data and said prescribed print process program from said first memory means to said controller by way of said first transmitter/receiver means in response to an information request signal from said controller;
   said controller comprising:
   second transmitter/receiver means connected to said first transmitter/receiver means of each word processor for transmitting and receiving information to/from each of said word processors, means for inquiring of each word processor as to the presence or absence of a print request signal and sending the information request signal to a word processor for which a print request signal is present, second memory means for storing information including text data and a print process program which have been sent from the word processor for which a print request signal is present in response to the information request signal and received through said second transmitter/receiver means, means for creating dot-matrix print data based on the information stored in said second memory means, and means for transferring the dot-matrix print data to said printer for printing.

4. A controller adapted to be connected between a plurality of word processors and a printer for controlling printing of text data, which is created on any one of said word processors, by said printer in accordance with a print process program specific to said one word processor, said controller comprising;
   transmitter/receiver means connected to each of said word processors for transmitting and receiving information to/from each work processor;
   means for inquiring of each word processor as to the presence or absence of a print request and for sending an information request signal to a word processor for which a print request is present;
   memory means for storing information including text data and a print process program which have been transmitted from the work processor for which a print request is present in response to the information request signal and received through said transmitter/receiver means;
   means for creating dot-matrix print data based on the information stored in said memory means; and
   means for transferring the dot-matrix print data to said printer for printing.

5. A controller according to claim 4, wherein said information is transmitted from the word processor for which a print request is present in the form of a modulated signal produced by modulating a first synchronization clock with said information, and wherein said transmitter/receiver means comprises means for generating a second synchronization clock having the same frequency as that of the first synchronization clock and a decoding circuit for decoding the modulated signal with the second synchronization clock.

* * * * *